5 Sheets—Sheet 1.
C. M. ROBERTS.
PROCESS AND MACHINERY FOR MANUFACTURE OF FLOUR.
No. 193,039. Patented July 10, 1877.
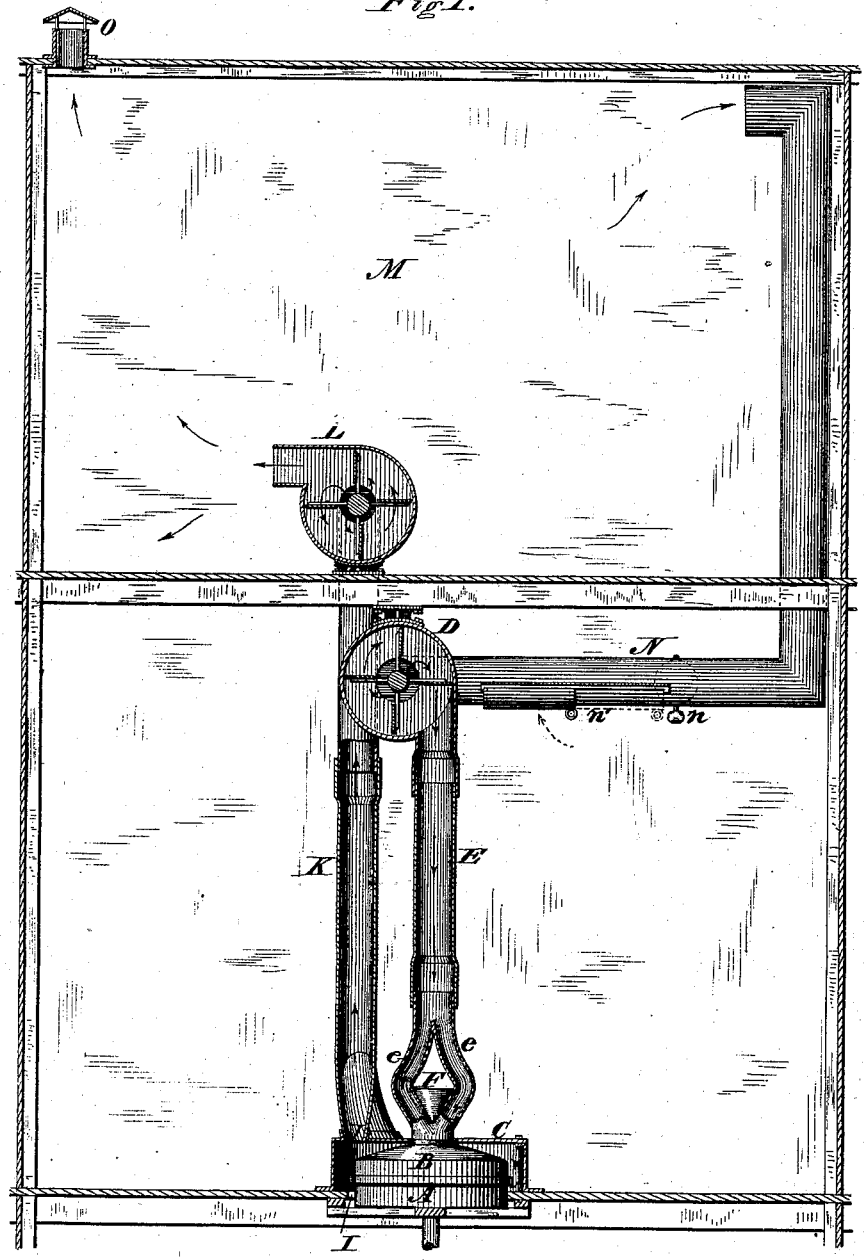

C. M. ROBERTS.
PROCESS AND MACHINERY FOR MANUFACTURE OF FLOUR.
No. 193,039. Patented July 10, 1877.
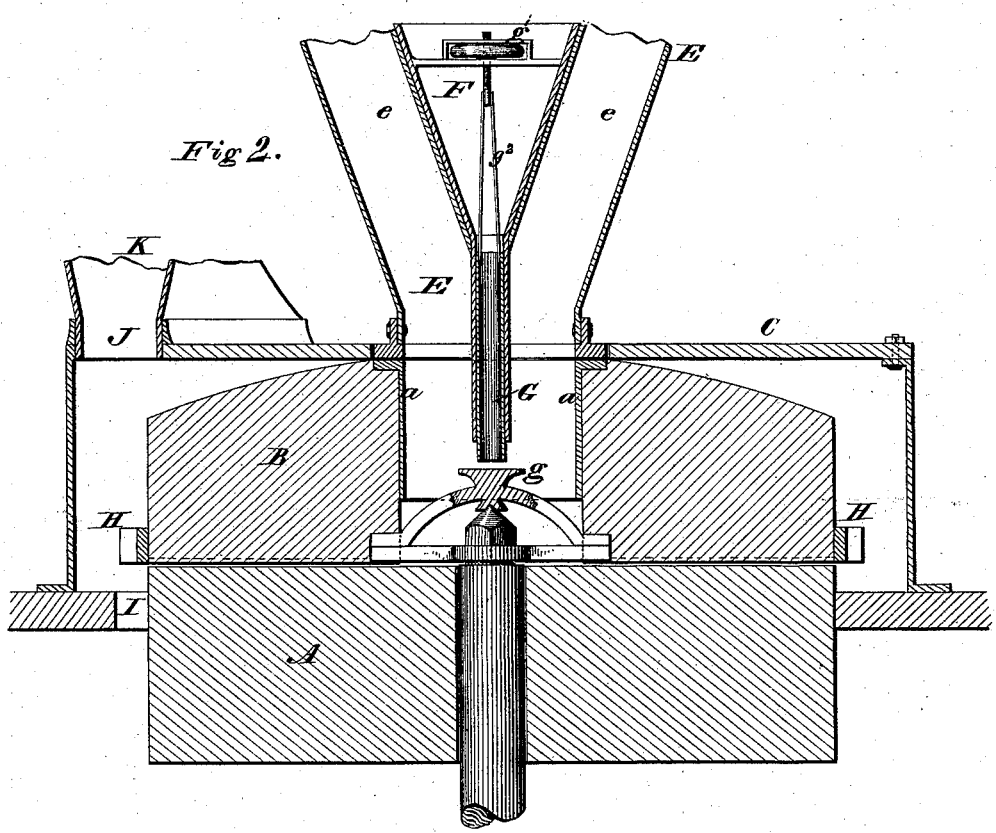
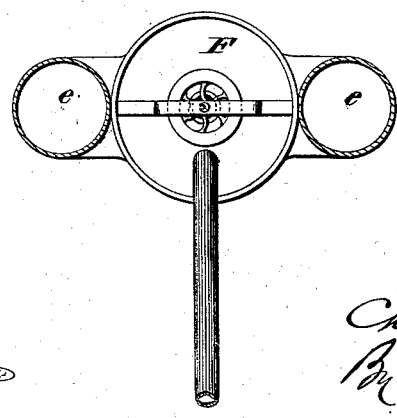
Witnesses.
Harry King
J. McKenny
Inventor.
Charles M. Roberts
By Hill & Ellsworth
His Atty C. M. ROBERTS.
PROCESS AND MACHINERY FOR MANUFACTURE OF FLOUR.
No. 193,039. Patented July 10, 1877.

C. M. ROBERTS.
PROCESS AND MACHINERY FOR MANUFACTURE OF FLOUR.
No. 193,039. Patented July 10, 1877.
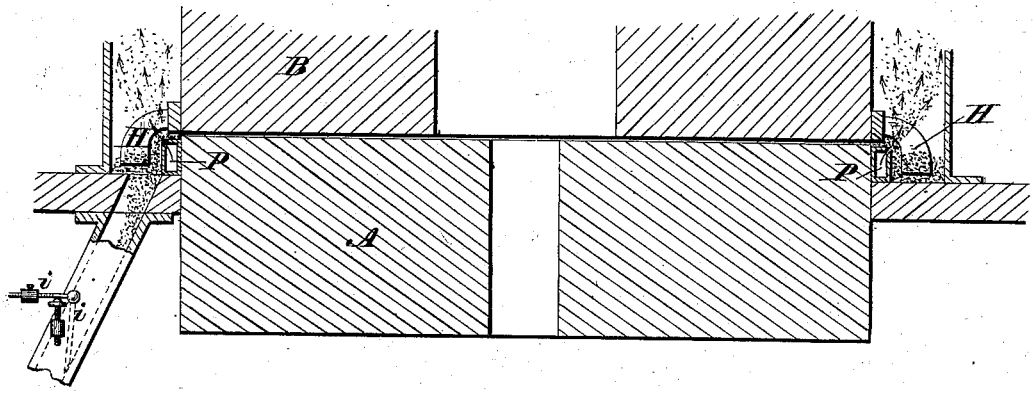
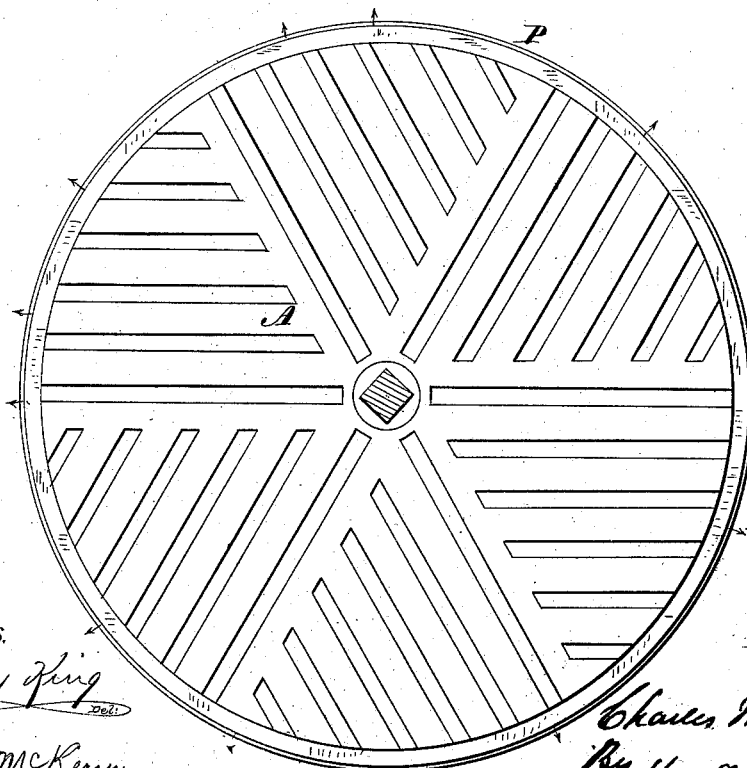

5 Sheets—Sheet 5.

C. M. ROBERTS.
PROCESS AND MACHINERY FOR MANUFACTURE OF FLOUR.

No. 193,039. Patented July 10, 1877.

Witnesses
Harry King
Frank McKenny

Inventor
Charles M. Roberts,
By His Attys

UNITED STATES PATENT OFFICE.

CHARLES M. ROBERTS, OF WASHINGTON, DISTRICT OF COLUMBIA.

IMPROVEMENT IN PROCESSES AND MACHINERY FOR MANUFACTURE OF FLOUR.

Specification forming part of Letters Patent No. 193,039, dated July 10, 1877; application filed June 28, 1877.

*To all whom it may concern:*

Be it known that I, CHARLES M. ROBERTS, of Washington, in the District of Columbia, have invented a new and Improved Process and Machinery for the Manufacture of Flour; and I do hereby declare the following to be a full, clear, and exact description of the same, reference being had to the accompanying drawings, forming part of this specification, in which—

Figure 4:
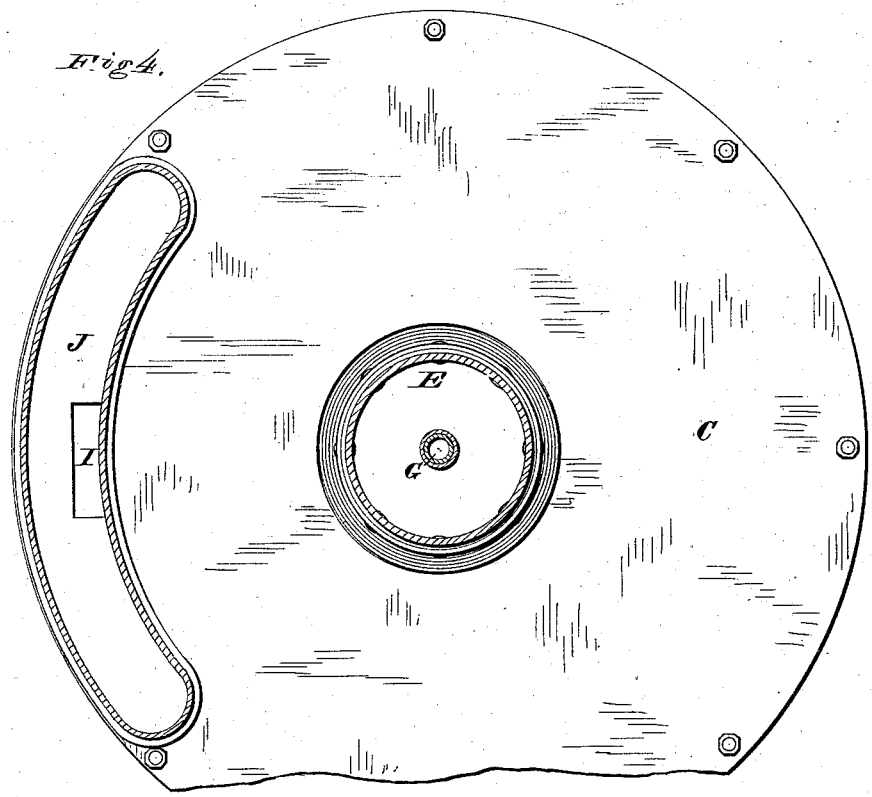
Figure 5:
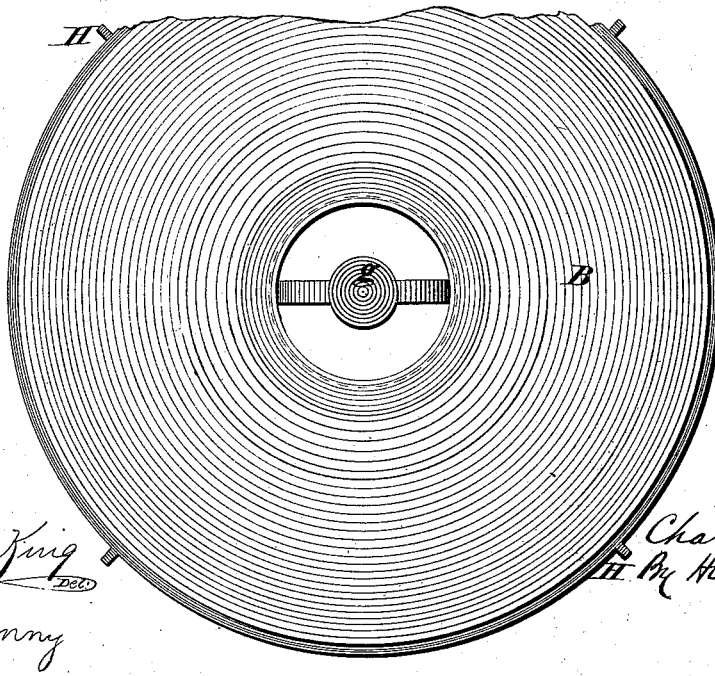
Figure 8:
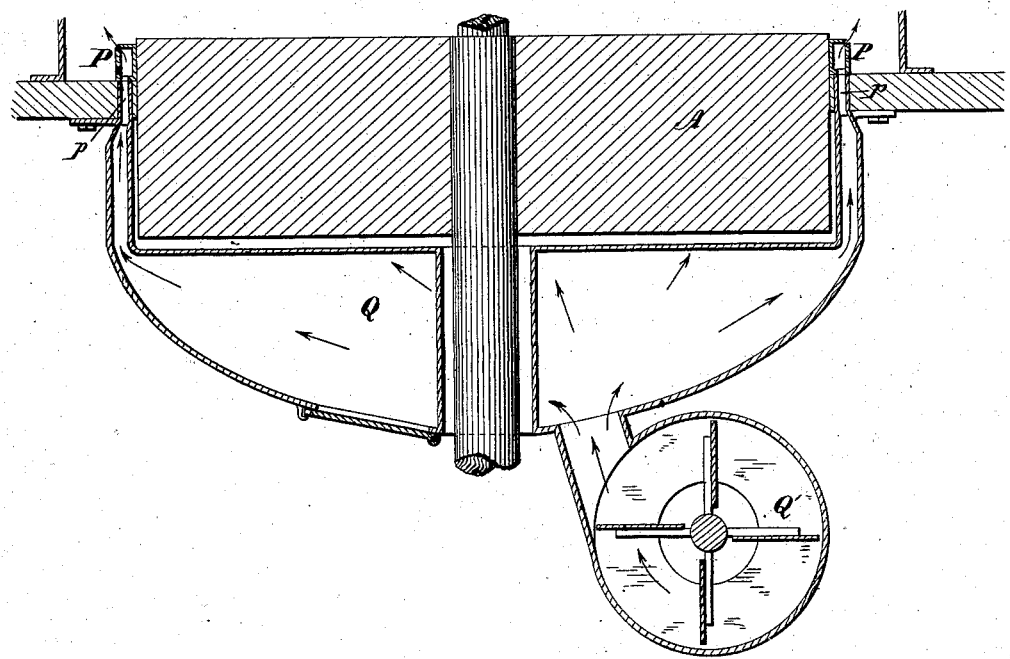
Figure 9:
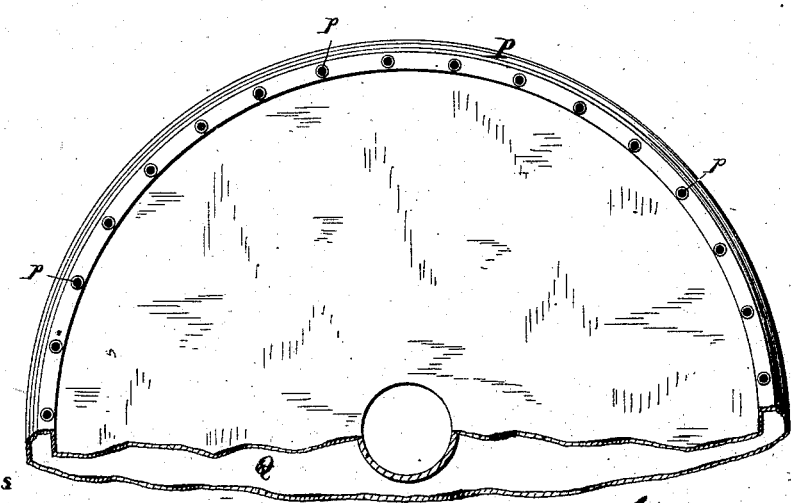

Figure 1 is a vertical section of the mill and of the blast and suction apparatus. Fig. 2 is a vertical section of the millstones, with their inclosing-case, feeding apparatus, and other connected mechanism. Fig. 3 is a horizontal section of the blast-pipes, showing a plan view of the hopper and the device for adjusting the feed-valve. Fig. 4 is a top plan view of the hoop or case inclosing the millstones, showing, in horizontal section, one of the suction openings therein, and the blast-pipe and feed-valve. Fig. 5 is a plan of the upper stone, showing one mode of applying the lateral rakes or sweeps thereto. Fig. 6 is a vertical section of the millstones, showing the supplementary blast-tube, the rakes, and the discharge-valve for the flour, middlings, and bran. Fig. 7 is a top plan view of the bed-stone, showing the surrounding air-pipe, the arrows indicating the currents moving upward and outward therefrom. Fig. 8 is a vertical section, showing one mode of producing the air-blast in the supplemental blast-pipe surrounding the bed-stone; and Fig. 9 is a bottom plan view of the bedstone and supplemental blast-pipe, showing the tubes which convey the air from the fan to such pipe.

Similar letters of reference in the accompanying drawings denote the same parts.

In the manufacture of wheat flour by the processes heretofore in use, two difficulties have been encountered, which, from their peculiar relation to each other, have been regarded as practically insurmountable, for the reason that any attempt to overcome either caused a proportionate aggravation of the other. These difficulties have arisen at the outset of the work, to wit, the grinding of the wheat, and have resulted from the operation of the grinding-surface upon the berries. On the one hand, where the system of high milling has been adopted, it has been found impossible to obtain the entire yield of flour, because the stones, under that system, are set too far apart to detach all the flour from the hulls, and no subsequent process of bran-dusting has ever been able to compensate for the loss thus occasioned. On the other hand, where the system of low milling is used, as ordinarily practiced, a portion of the wheat is reduced to meal of the proper quality almost immediately upon its entrance between the burrs, and then, instead of being instantly ejected while in proper condition, it is obliged to work its way slowly out to the edge of the stone, during which passage it is ground over and over until it is heated, its natural oils, moisture, and gluten liberated, and its quality impaired. In such regrinding a part of the bran is so finely pulverized that it cannot be afterward sifted from the flour, while other portions, coming in contact with the liberated moisture and gluten, are pasted to the flour and middlings so tenaciously that no subsequent treatment can detach them.

My present invention consists in the discovery of a process of grinding and purifying, and the invention of mechanism therefor, by which all these difficulties are obviated, and the greatest yield secured with the best quality of flour.

The principle of the invention consists, first, in filling the eye of the stones with air under great pressure, by means of a fan, pump, or other equivalent means. The air, passing in between the burrs with the wheat, assists in feeding the wheat to the grinding-surfaces, and forces out the meal all around the burrs as fast as it is ground. The force of the blast should be sufficient to eject the meal instantly from the grinding-surfaces, so that it will not be ground over and over, and so that the bran will not be ground too fine to be sifted from the flour. The stones should be adjusted just far enough apart to clean the bran without disintegrating it, and to this end I recommend that the actual thickness of the hull of the grain be taken as the proper minimum distance between the stones or other grinding-surfaces. One effect of the air-blast will be to cool the stones, but this is only an incidental result and is not the main object. A light current, produced either by blast or suction, will cool the stones, but will not fully accomplish my main object of forcing the feed of the wheat and instantly ejecting the meal as fast as it is produced, which is only to be accomplished by a powerful blast forced in with the wheat and not drawn in by suction.

One consequence of this blast is that it causes the meal to be projected from the edge of the stones in a wide, thin, horizontal sheet of uniform density, and of a vertical thickness equal to about the distance between the grinding-surfaces. The meal thus spread out is in exactly the proper condition to be acted upon by a gentle current of air, for the purpose of separating and removing from it the light "specks" and "fuzz," which constitute the chief obstacle to the purification of flour and middlings.

I, therefore, as the second part of my invention, apply to the thin sheet of meal around the edge of the stones a light upward current of air, preferably in the form of thin jets or a continuous thin sheet, which, blowing up through the horizontal thin sheet of meal, lifts the light impurities therefrom, and carries them upward until they come within the influence of a gentle upward current of air induced in the upper part of the hoop or inclosing-case by means of a suction-fan. The heavy flour, middlings, and bran fall, by the action of gravity, upon the floor of the hoop, and are thence delivered by suitable rakes or scrapers, through a normally-closed valve-spout, into a suitable receptacle below, or directly into a separating bolt or screen, which separates the flour, the bran, and the middlings. The middlings are afterward subjected to a similar operation between two other grinding-surfaces in connection with air blast and suction substantially as before, by which they are separately purified, and after being purified, are reground, rebolted, and mixed with the flour purified at the first operation. The entire combination of processes, therefore, includes the perfect grinding of the grain, so as not to impair its quality, the purification of the fine flour, the separation and grading of the materials, the complete purification of the middlings, and the rebolting and mixing of the purified middlings with the purified flour.

The mechanical means which I prefer for the accomplishment of these results are represented in the accompanying drawings, which I will now proceed to describe.

A B represent the first grinding-stones or burrs. No particular mode of dressing these burrs is necessary; but I prefer to dress them with broad smooth furrows and narrow lands.

The ordinary hoop C may be used; but I prefer to substitute therefor a larger inclosing-case, so as to give more space for the thin horizontal sheet of meal around the burrs, and to make this casing high enough to provide abundant space for the gentle upward air-current induced by the suction-fan.

If the casing is two or three feet higher than the burrs, or more than that, it will be of advantage.

Into the eye of the runner B I fit the lower end of a large air-pipe, E, by any suitable means which will make a tight joint without interfering with the action of the stone, the pipe being supported by securing it, in any proper manner, to the top of the air-chamber C. Through the pipe E a powerful blast of air is continuously forced into the eye by means of a fan, D, or its equivalent, driven at a high speed by any suitable mechanism.

The air may be supplied to the fan by a pipe, N, leading from the dust-room M, or the passage from the dust-room may be closed by a damper, n, and the air taken from the lower chamber through a valve, n'; or, if preferred, the air may be taken from outside of the mill by a suitable pipe.

The grain is fed into the eye with the air-blast, the means employed for that purpose being, preferably, a hopper, F, communicating with the eye through an adjustable tubular valve, G, connected, by arms $g^2$, to an adjusting-screw, $g^1$, above the grain in the hopper. The weight of the grain in the hopper and feed-tube will be sufficient to resist the force of the air-blast, and the raising and lowering of the feed-tube will, in connection with the saucer $g$, control the feed.

The eye should be lined with some suitable material, as shown at $a$, in order to effect an air-tight joint with the casing, the lining being extended up, or a tube from the casing down sufficiently far for that purpose.

Around immediately beneath the edge of the bed-stone I apply a horizontal air-tube, P, having a thin slot or line of perforations along its upper edge, and connected by a series of pipes, $p$, with a compressed-air reservoir, Q, or a blast-fan, Q'. As the meal is projected outward from the stones by centrifugal action, combined with the force of the blast from the eye, it is acted upon by the thin upward current from the pipe P in such a manner that the light impurities are carried upward, while the flour, middlings, and bran fall, and are, by means of scrapers H, forced into the meal-discharge pipe I. When the accumulated meal in the discharge-chute overcomes the resistance of the counterbalanced valve $i$, the latter opens, discharges its load, and automatically closes to receive a new charge.

The rakes H may be of any suitable form, and may, if preferred, be inclined so as to scoop under the meal and lighten it up, in order to increase the action of the blast upon it.

Having thus provided for the action of an upward current of air upon and through the horizontal sheet of meal around the edge of the stones, I connect the upper end of the casing or air-chamber C with a slow suction-fan, L, by means of an air-pipe, K, extending from the suction side of the fan to a series of openings, J J J, in said casing or air-chamber. The force of the suction-fan is nicely adjusted, so that it will induce a light uniform upward current in the top of the air-chamber C sufficiently strong to carry up the light impurities, but not the fine flour. The light impurities are discharged into the dust-room, which is provided with a ventilator, O. The force of all the air-currents is under the control of the attendant by means of suitable valves in the pipes or elsewhere, or by controlling the speed of the fans or other blowers.

The blast-fan Q' may be omitted, if prefered, and the pipe P filled by a tubular connection with the pipe E, provided with a suitable adjusting cock or damper.

The flour, middlings, and bran having thus been purified of the light pulverulent matters which they contained when discharged from the stones, are then bolted so as to separate the flour and coarse bran from each other and from the middlings. The middlings will then be found comparatively pure, and may be reground, rebolted, and mixed with the flour, if desired; but as the suction at the flour-burrs is made very light, in order not to waste the flour, it will be found advantageous to put the middlings through another similar process of spreading and purifying by means of middlings-burrs combined with air blasts and suction similar to those already described. The middlings-burrs may be made of disks of iron, wood, or other suitable material, their office being to reduce the middlings to, and discharge them in, a thin sheet, so that the purifying currents can properly act upon them. The suction-current at the middlings-burrs should be somewhat stronger than at the flour-burrs, as the greater weight of the middlings will prevent loss therefrom, and the purification will be more effectual. The middlings resulting from this process will be of the best and purest quality, and may be reground, rebolted, and mixed with the flour in the usual manner; but in regrinding I recommend the employment of the air-blast in the eye of the stone in order to prevent injury to the quality of the flour.

In describing the auxiliary upward current of air introduced by means of the pipe P, I have intended to describe the best means for accomplishing the purpose; but I do not mean to be understood that said pipe or its equivalent is absolutely essential, inasmuch as the air-suction from fan L will accomplish the result measurably without the assistance of the blast from pipe P. Again, when pipe P is used, even the suction-fan L may be omitted without destroying the useful character of the machine, for the upward currents from pipe P will, if outlets in the top of the casing be provided, carry off a large proportion of the light impurities; and even without the suction-fan L or blast-pipe P the force of the blast coming out from between the stones will operate to take up through the top of the casing large quantities of said impurities.

The use of the apparatus in any of these modes I consider as merely the inferior equivalent of the combined operation of the main air-blast, supplementary air-blast, and suction-fan, which, working together, accomplish the result much more fully and perfectly; and I regard the use of the powerful forcing-blast in grinding, in connection with the subsequent purification of the meal or middlings by air-currents, as involving the general principle of my invention.

The arrangement of the grain-hopper between the branches e e of the blast-pipe is not essential. Any other arrangement that will answer the purpose may be employed.

In the winter season it will be desirable to take the blast-air from the dust-room, (which should be a large room,) in order to get the benefit of the higher temperature caused by the suction from the air-chamber C.

It will be observed that one part of my invention is the process of first purifying the entire mass of meal, then separating the flour and middlings therefrom, and then repurifying the middlings, and regrinding and rebolting them. This process will be of advantage whatever system of grinding may be employed, and, although I regard my system as incomparably the best, I do not limit this part of the invention to any mode of grinding.

The invention comprises an entire system of milling, beginning at the grinding of the wheat, and ending at the complete purification of the flour and its separation and grading for the market. The system, as a whole, avoids the disadvantages of the old systems of grinding, giving the best yield with the best qualities, obviates the necessity for employing costly machines for purifying the middlings, and saves the time, labor, and power necessary for such operations. If, for any purpose, it is not desirable to use it at any time, the operator has only to ungear the fans, and the mill will then operate on the old principle.

I claim as my invention—

1. The process of manufacturing flour by first grinding the wheat in connection with a strong air-blast introduced at the eye of the stones to expel the meal, and afterward purifying the ground meal or middlings by means of air-currents, in whole or in part, substantially as described.

2. The process of manufacturing flour by first grinding the grain, then purifying the meal by air-currents, then separating the flour, middlings, and bran, and then purifying the middlings by air-currents, and regrinding and rebolting them, substantially as described.

3. The process of purifying meal or middlings by first forcing them by a blast of air between two disks, one or both of which revolve, in order to spread them out in a thin sheet, and then subjecting them to the operation of air-currents to remove the light impurities, substantially as described.

4. The combination of a bed-burr, a runner, a blast apparatus to blow air into the eye of the burrs, and a blast or suction apparatus to create a purifying air-current up through the meal ejected from the edge of the burrs, substantially as described.

5. The combination of the burrs A B, casing C, and blast-pipe E, with the normally closed discharge I, and the air-openings J in the top of the casing, to accommodate the discharge of the air-currents with the light impurities, substantially as described.

6. The combinution of the burrs A B, casing C, blast-pipe E, suction-pipe K, and the dust-room M, substantially as described.

7. The combination of the blast arrangement D E N, with the dust-room M, suction fan and pipe, and burrs and casing, substantially as described.

8. The combination of the blast-pipe P with the burrs, substantially as described.

9. The combination of the blast-pipe P with the burrs, the casing, and the suction pipe or pipes, substantially as described.

10. The combination of the blast-pipe P with the burrs, the casing, the suction pipe or pipes, and the blast in the eye of the burrs, substantially as described.

CHARLES M. ROBERTS.

Witnesses:
   A. D. V. BURR,
   SAML. C. MILLS.